N. Rillieux,
Vacuum Pan,
Nº 3,237. Patented Aug. 26, 1843.

UNITED STATES PATENT OFFICE.

NORBERT RILLIEUX, OF NEW ORLEANS, LOUISIANA, ASSIGNOR TO SAML. V. MERRICK AND JOHN H. TOWNE.

IMPROVEMENT IN SUGAR-WORKS.

Specification forming part of Letters Patent No. 3,237, dated August 26, 1843.

*To all whom it may concern:*

Be it known that I, NORBERT RILLIEUX, of New Orleans, in the parish of Orleans and State of Louisiana, have invented certain improvements in the method of evaporating and concentrating saccharine juices and sirups in the manufacture of sugar, and which is applicable to the evaporation of other fluids; and I do hereby declare that the following is a full, clear, and exact description of said improvements.

My invention consists of four leading improvements on the methods known, viz:

The first improvement is in the manner of connecting a steam-engine with the evaporating pan or pans in such manner that the engine shall be operated by the steam in its passage to the evaporating pan or pans, and the flow of steam be so regulated by a weighted or other valve as to reach the said pan or pans at the temperature required for the process—that is to say, where the saccharine juice boiled—the steam at the same time having access to the pan or evaporator without passing through the engine by the said valve, which is weighted or otherwise regulated to insure the supply of steam to the said pan or evaporator at the required pressure.

The second improvement is for the combination of the vacuum-pan or evaporator, (known as the "Howard Saccharine Evaporator,") in which the sirups are evaporated *in vacuo*, with a pan or evaporator or boiler in which the saccharine juices are prepared to be transferred to the vacuum-pan or evaporator, and which at the same time generates the vapor from the saccharine juices to supply the vacuum pan or pans with the required quantity of steam or vapor under sufficient pressure and of a temperature sufficiently high to produce ebullition in the vacuum-pan or evaporator.

The third improvement relates to an amelioration of that kind of evaporator known as the "Champenoise column," and consists of an outer envelope to this column, by which I am enabled to adapt it to the condition of my second improvement.

The fourth improvement is a method of regulating the concentration of the sirup by means of a differential thermometer, which indicates the degree of concentration of the sirup without being affected by any change in the pressure under which the sirup is evaporated or concentrated, and also for an arrangement of such thermometer by which its range of action up to a given point does not act on the regulator which governs the supply of the concentrated or non-concentrated saccharine juice, either of which will regulate the degree of concentration of the sirup.

Having described the nature of my improvements, I shall proceed to describe the construction of the apparatus and the operation thereof by reference to the accompanying drawings, which make a part of this specification, and in which the letters of reference indicate the same parts in all the sections of the first improvement.

Figure 1:
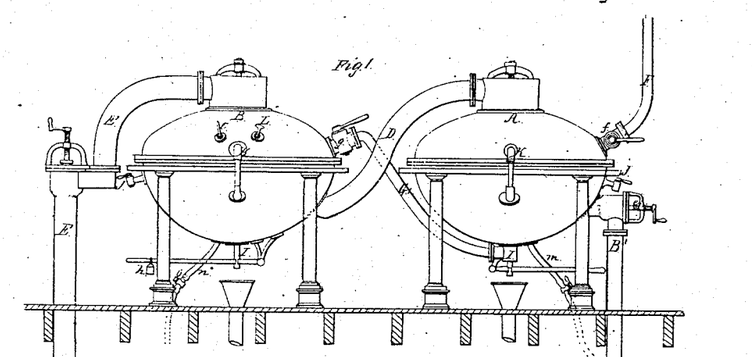
Figures 1, 2, 3, 4, 5, 6:
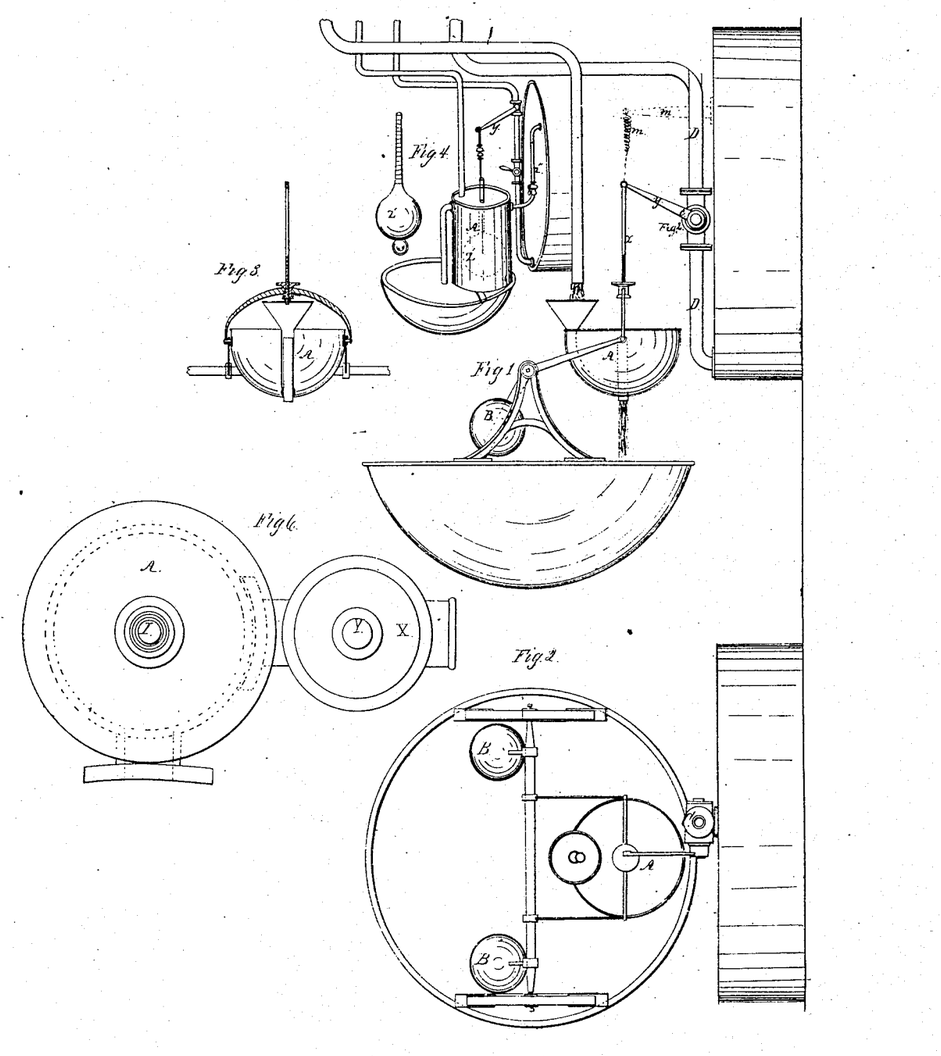
Figure 2:
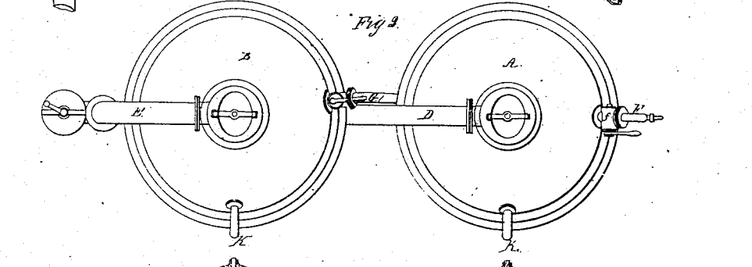

The mechanism and apparatus under this head are represented in the accompanying drawings, in which Figure No. 4, Plate 1, is an elevation of the steam boiler or boilers, steam-engine, the evaporating-pans, and the connection of the three; and Fig. 1, Plate 4, is a section of the engine with the steam-pipes which form the connection between the boiler, the engine, and the evaporating-pans. The main steam-pipe B' from the boilers A' extends to the pan or evaporator A, and introduces the steam in the false bottom $d$, and at $a$ there is a branch pipe conducting to the cylinder C of the steam-engine, and another at $c$, which connects with the eduction-valve of the engine, and between these two branch pipes, which are the induction and eduction pipes, the main steam-pipe B' is provided with a loaded throttle or other valve, as at $b$, Fig. 1, Plate 4, and $r$, Fig. 4, Plate 1. By this arrangement it will be evident that the engine can only be worked by the pressure of the steam over and above that required for the pan or evaporator A, and as the steam cannot pass the weighted or throttle or other regulating valve, except it be of a higher pressure than is required to move the steam-engine, it passes through the pipe $a$ to the engine, and from thence through the eduction-pipe $c$ to the false bottom $d$ of the pan, and all the additional steam that is required beyond that which passes through the engine goes directly through the eduction-pipe $c$ and regulating-valves to the evaporating-pan. The difference between the pressure in the boilers A' and the false bottom $d$ will be the effective pressure exerted on the piston of the engine. Thus all the steam generated in the boilers A', except the small quantity condensed, will be conducted and give out its heat to the pan or evaporator A. It is of course to be remembered that the pressure of the steam in the false bottom $d$, or rather its temperature, is to be regulated in the usual way. Should it be desired at any time to conduct the steam directly to the pan or evaporator A without working the engine, the valve $b'$ is closed, and the steam passes along the main pipe B', its pressure or temperature being regulated in any of the well-known methods. This arrangement is applicable to all kinds of boilers and evaporators. The throttle-valve in this arrangement can be connected with the governor of the steam-engine in manner well-known to every engineer, and need not therefore to be described; but for this arrangement, or something substantially the same, the pressure of steam would be the same on both sides of the piston, which would prevent the operation of the engine of the second improvement. This improvement is represented by Plate 1, in which Fig. 1 is an elevation of the pans or evaporators, with their connecting-pipes, &c. Fig. 2 is a plan, and Fig. 3 a longitudinal section, of the same; and Fig. 4, an elevation of the the whole apparatus connected with the steam-boilers, engine, and condenser. The pan A or evaporator is constructed with a double bottom, or by tubular boilers or any other form of vacuum sugar-pan, leaving a space, $d$, into which steam of the required pressure is introduced from a steam-generator through the steam-pipe B', there being a stop-cock or other valve, $v'$, to regulate or cut off the steam when required. The peculiar construction of this pan need not to be described, as it is only necessary to state that it should have two chambers—one for the saccharine juice and the other below it for the steam—the two pans or sets of pans, which may be similarly constructed. The saccharine juice is introduced into the pan or evaporator A by the pipe F, provided with a stop-cock, $f$, and there boiled by the heat of the steam introduced in the double bottom $d$ or other form, as before described, and the steam arising from the evaporation of the saccharine juice in this the first pan is employed to boil the concentrated juice or sirup in the second pan, B, by passing off from the pan A through the pipe D to the double bottom $d'$. The concentrated saccharine juice or sirup in the second pan, B, is boiled or evaporated *in vacuo*, after the manner of the well-known Howard process, by connecting the upper part of the pan with a condenser and air-pump, E being the connection-pipe, G the condenser, and H the air-pump operated by the steam-engine or other power, and as these parts of the apparatus are well known to every engineer, it is not necessary to describe them. The connection between the first and the second pans, A B, is by a pipe, G', which passes through the double bottom of the former, where it is provided with a valve, I, opening inward and with the top of the latter, it being provided with a stop-cock, $g$, near its junction with the pan B, to regulate the supply of the concentrated saccharine juice to the second or vacuum pan. The operation of this part of the operation is very obvious. The pan B being exhausted by its connection with the condenser and air-pump, and the stop-cock $g$ being opened, the saccharine juice, which has been concentrated in the pan A by the steam in the false bottom $d$, is forced up the pipe G' into the pan B by the elastic force of the steam generated from the saccharine juice, and after the sirup has been sufficiently reduced in the second or vacuum pan, B, it is drawn off through a pipe, H', which is provided with a weighted valve, I, opening inward, and having a lever and weight, $n$, the stem of the valve passing down through a pipe, which connects the double bottom. These pans are provided with man-holes, a glass gage or indicating-tube, K, to indicate the level of the juice, blow-cocks J J, to expel the air from the double bottom, thermometer and ebullition-gage O L, and pipes $m$ $n$, to discharge the water produced by the condensation of the steam in double bottoms or steam-chambers $d$ $d'$.

Another method of applying this my second improvement is represented in the same plate, in which Fig. 5 is an elevation, and Fig. 6 a plan. In this modification the saccharine juice, instead of being concentrated by steam of a pressure equal to or greater than the atmosphere, which at the same time generates the steam from the saccharine juice to boil the sirup in the vacuum-pan, is concentrated in a boiler heated by fuel in the usual manner of a steam-boiler. By reference to the drawings it will be seen that all the connections in this modification are substantially similar to the first, except in form and the application or substitution of a common steam-boiler for the first pan, A, in the first-described modification. The boiler A and vacuum-pan B, under this modification, are represented as cylindrical; but under either of the modifications any form can be adopted in the judgment or fancy of the constructer. The supply pipe F is provided with a float and valve, $i$ $i$, to regulate the supply of saccharine juice. The float $i$ rests on the surface of the saccharine juice, and is attached to the lever of the valve $i$, which governs the aperture of the feed-pipe, so that when the saccharine juice rises too high the float is elevated and closes the aperture, which stops the supply, and when it sinks too low the float, following it, opens the valve, and thus regulates the supply.

The degree of concentration of the sirup in the pan B may be regulated by an apparatus attached to the pipe G, that conveys the concentrated saccharine juice from the boiler or pan A to the pan B, which apparatus acts by the specific gravity of the sirup in the following manner, viz: The reduced sirup is regularly discharged from the pan B by a pipe, H, which leads and discharges into a vessel, I, provided with what is well known as a "level" tube, through which the sirup is discharged into a double-bottomed pan, K, after it reaches a certain height in the vessel. This double-bottomed pan K is heated by vapor from the boiler A, and in it the sirup is further reduced and prepared for casting into form. The vessel I is hung by journals to a bent lever, k, and by rods or chains to the lever of a valve, l, in the conducting-pipe G', that supplies the pan B with the concentrated saccharine juice. The weight on the bent lever is so regulated with reference to the specific gravity of the quantity of sirup which the vessel I can contain and to its connection with the feed-valve in the pipe G' as to open the valve l when the specific gravity of the sirup becomes too great and to close it when its specific gravity is not sufficient. In this way it is evident that the degree of concentration of the sirup can be regulated with the most perfect accuracy. This method of regulating the supply of concentrated saccharine juice and of insuring the discharge of the sirup at the point of concentration required I intend to secure by a separate patent, as I shall claim under this patent another method of effecting this object.

Of the third improvement: This improvement is represented in Plate 2 of the accompanying drawings, in which Fig. 1 is a longitudinal elevation; Fig. 2, a plan; Fig. 3, a transverse elevation, representing the condenser in section; Fig. 4, a longitudinal section of the vacuum-evaporator; Fig. 5, the same of the pressure-evaporator, and Figs. 6, 7, 8, 9, and 10 separate parts in section. As the two evaporators are similarly constructed, it will only be necessary to describe the construction of one of them and the manner of connecting the two.

The apparatus known as the "Champenoise column," on which my said third improvement is based, consists of a vertical metallic column, A', the upper end of which is dome-shaped or semi-spherical. Within this column there is a steam-pipe, D', extending from the base of the column to within a short distance of the top, through which steam is admitted to the inside of the column to heat it to the required temperature. The saccharine juice or sirup is discharged on the semi-spherical top or dome of this column, and in passing down is evaporated; but by this arrangement it is evident that the evaporation must take place under the pressure of the atmosphere, and that thus constructed it is not applicable to the Howard process of evaporation in vacuo, which is highly important in the concentration of sirups. I have therefore so improved this apparatus as to bring it within the conditions of the Howard process; and my second recited improvement—viz., the employment of an evaporator which works at or above the pressure of the atmosphere, in combination with a second, which evaporates in vacuo, the steam for heating the second being supplied from the first by the evaporation of the saccharine juice, and hence I have to employ two such columns. The column is represented at A', Fig. 5, and the inner steam-pipe which it envelops is represented at D', Fig. 4.

My improvement consists simply in enveloping this column with an outer casing, as at A B. The two evaporators being thus constructed and enveloped by an outer casing, it remains simply to describe the manner of connecting them with each other and with the boiler and condenser, and also the manner of supplying the saccharine juice to the first and the concentrated juice to the second. The main steam-pipe C communicates with the vertical steam-pipe D' within the first column, A, through a passage, R, in the base; and the saccharine juice is introduced and discharged onto the top or dome of this column A' by the pipe F, which is connected with a bifurcated pipe, n, that turns in a collar or stuffing-box in the upper end of the outer casing, and is made to rotate, to insure the regular discharge of the juice, by miter-wheels on the shaft of the bifurcated pipe, and a horizontal shaft, o, that receives motion from the steam-engine or other first mover, the shaft and pipe being provided with stuffing-boxes to prevent the escape of steam. The saccharine juice, being thus equally distributed on the dome of the column, runs down to the bottom, and, in passing over the surface heated by steam, as before described, is sufficiently evaporated or concentrated to be transferred to the other column, where it is further evaporated in vacuo. It is then forced out by the pressure of the steam generated from the juice in concentrating it through the passage w in the base of the column, (see Fig. 8,) which communicates with the top of the vacuum-evaporator B by means of the connecting-pipe G; and it is there discharged on the top or dome of the column B' in the same manner and by the same means as the saccharine juice is delivered on the first column, except that in the latter the miter-wheels, &c., to rotate the discharge-pipe are outside of the surrounding case at p. The steam or vapor from the saccharine juice in the evaporator A passes off through the pipe D, enters the base of column B' at R', up the pipe D', and is discharged at the required temperature near the upper part of the column. The upper part of the evaporator B communicates by the pipe E with the condenser Q, of any construction; but the one represented in the drawings is made after the manner of the well-known Hale condenser, and therefore needs not to be described. It is of course understood that the condenser is provided with an exhausting or air pump. The evaporators A and B may be provided with a glass gage, S, to indicate the level of the saccharine juice and sirup, and with a thermometer and steam-gage. The water or condensed vapor is discharged from the base of column A' through an aperture, $r$, (represented by dotted lines in Fig. 8,) and from the column B' through the aperture $v$, Figs. 6, 7, and 9, each of which communicates with its appropriate pipe, $m$ and $n$. The sirup passes out from the evaporator B, through the aperture $w$, into the vessel H, that contains a differential thermometer to regulate the bake or concentration of the sirup, and from the vessel it is discharged into the double-bottom pan K, already described, by a rotating cock, X, known as the "rotating feeding-cock." This cock has a chamber or chambers in it, which, as it rotates, is alternately presented to the pipe leading from the vessel H and the pipe discharging into the pan K; and in this manner, for each chamber in the cock, at each rotation, a measure of sirup is discharged. Motion is given to this cock by the vertical arbor Y, which is geared with the horizontal shaft $p$, that communicates motion to the discharge-pipe $u$ in the evaporator B. A pipe, L, extends from the main steam-pipe C to each of the evaporators A and B, for the purpose of admitting steam to cleanse the surface of the columns A' and B'.

Of the fourth improvement: The manner of constructing the differential thermometer to govern the bake or concentration of the sirup under the head of my fourth improvement is represented under its various modifications in Plate 3, and the manner of applying it to the apparatus is represented in Figs. 1, 2, 3, and 6 of Plate 2, referred to in the description of my third improvement; but it is to be understood that this manner of applying it is only given as an exemplification, for it can be variously applied without changing the character of this invention—as, for instance, it is immaterial whether the application of it be made to govern the supply of the saccharine juice to the first evaporator, A, or to the second, B, from the first, as the object is to regulate the concentration of the sirup in the last evaporator B, and it is immaterial whether this is effected by one or the other. When applied to govern the supply of juice to the first evaporator, then the sirup should be regularly discharged from the last, for when the regulator indicates the concentration to be too great, the valve is opened, which admits a greater supply of saccharine juice to the first, which is forced by the pressure of the steam into the second the moment it has reached the bottom of the column, and when applied to regulate the discharge from the first to the last the discharge from the last should be regular, and the supply of the saccharine juice to the first should be regulated by a self-feeding apparatus or by hand, so as to make the supply correspond with the transfer from the first to the second. The object to be obtained is to increase the supply from the first to the last evaporator when the thermometer indicates the concentration to be too great, and to reduce it when it indicates insufficient concentration. In the vessel H, Plate 2, through which the sirup passes after it has been discharged from the second evaporator, B, is placed a differential thermometer, constructed in the manner represented by Figs. 5, 6, 7, and 8, Plate 3. A stem, $A^2$, projects from the bottom of this vessel H, to which is attached a metallic volute thermometer, $B^2$, composed of two plates of metal of different dilatation, soldered or otherwise firmly fastened together along their whole length. To the outer end of this volute is attached a bar of metal, $H^2$, and to this bar is also attached the outer end of another and similar metallic thermometer, $E^2$, the inner end of which is attached to a vertical spindle, $I^2$. The lower end of this spindle rests on the standard $A^2$, and its upper end is provided with an index-plate, $K^2$, with holes in its upper surface, and it is there connected with the spindle of the regulating or throttle valve V in the supply-pipe F, the lower end of the valve-spindle having a lever, and pin $L^2$ to take into the holes or the plate $K^2$, and thus establish the connection between the thermometer and regulating-valve, which can, by the index-holes and pin, be adjusted to any range of temperature required for the concentration of the sirup. The lower half, $B^2$, of this thermometer is always immersed in the sirup as it is discharged from the evaporator B, and the upper half, $E^2$, is acted upon only by the vapor arising from the said sirup.

It is a well known law that as the density of a fluid increases so does the difference between its temperature and that of the vapor arising therefrom also increases, and this difference at any given temperature and density, under all pressures, is a constant number; but the temperature of the two varies with the pressure, and as the sirup is concentrated in a vessel connected with a condenser exhausted by an air-pump, the pressure will necessarily change with the change of pressures, and this change takes place without affecting the degree of concentration of the sirup, but does change its temperature, so that simple thermometers could not effect the object in view, which is to regulate the degree of concentration; but as the difference between the temperature of the sirup and its vapor is a constant number at all degrees of concentration, running through every degree of pressure, it is evident that the range of pressure in the condenser or any vessel in connection therewith will not affect the differential thermometer, which indicates only a change in the difference of the temperature between the two, which change in the said difference also indicates a change in the concentration of the sirup. It is therefore immaterial in what manner these differential thermometers are constructed or in what manner they are applied to regulate the supply of saccharine juice or the discharge of the concentrated juice or sirup. Figs. 9, 10, 11, 12, and 13 represent different methods of constructing differential thermometers and different methods of applying them to this purpose. They may operate either by the expansion of metals or fluids. If fluids are employed, a greater range may be given to the follower or piston by constructing the pipes in any of the forms represented in Fig. 11.

As the thermometer is attached to a regulating-valve, it is important so to construct it that all its range up to a certain point should not act on the valve. For this purpose I construct them in the manner represented in Figs. 12, 13, and 14. The fluid or semi-fluid of which the thermometers are composed is put in the cylinders C F C F, and to each of these is fitted a piston on which the expanding fluid is to act. In the modification, Fig. 12, the cylinder C F is provided with a vessel, $m$, into which is fitted a follower, $n$, pressed down by a spiral or other spring, $S'$, on its stem, and as it requires less force to contract this spring than it does to operate the regulating-valve, all that part of the dilatation which takes place before the valve should be acted upon acts on the follower $m$, and when that has reached the limit of its range, then of course the valve is acted upon. In the modification, Fig. 13, instead of the additional vessel $m$, the piston $m'$ is attached to the connecting-rod $g$ by a spring, which yields to all the dilatation that takes place before the instrument should act on the valve.

Figure 3:
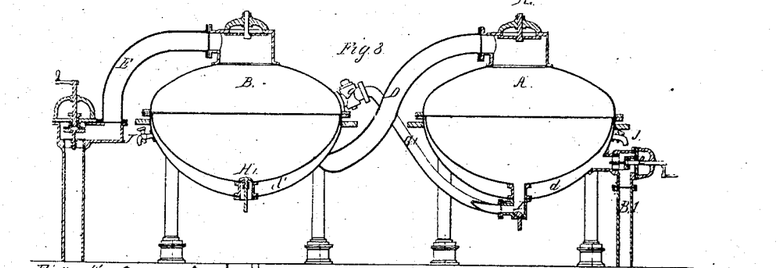
Figures 3, 4, 5, 6, 7, 8, 9, 10:
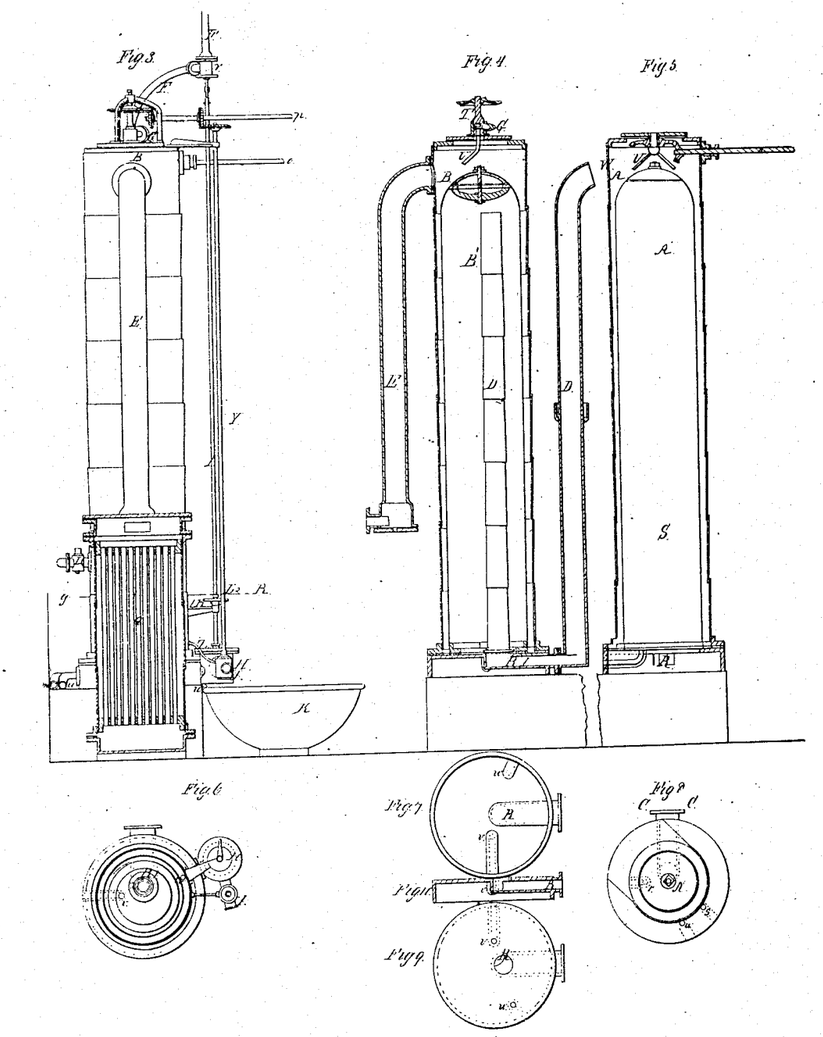
Figures 3, 5, 7, 9, 10, 11, 12, 13, 14:
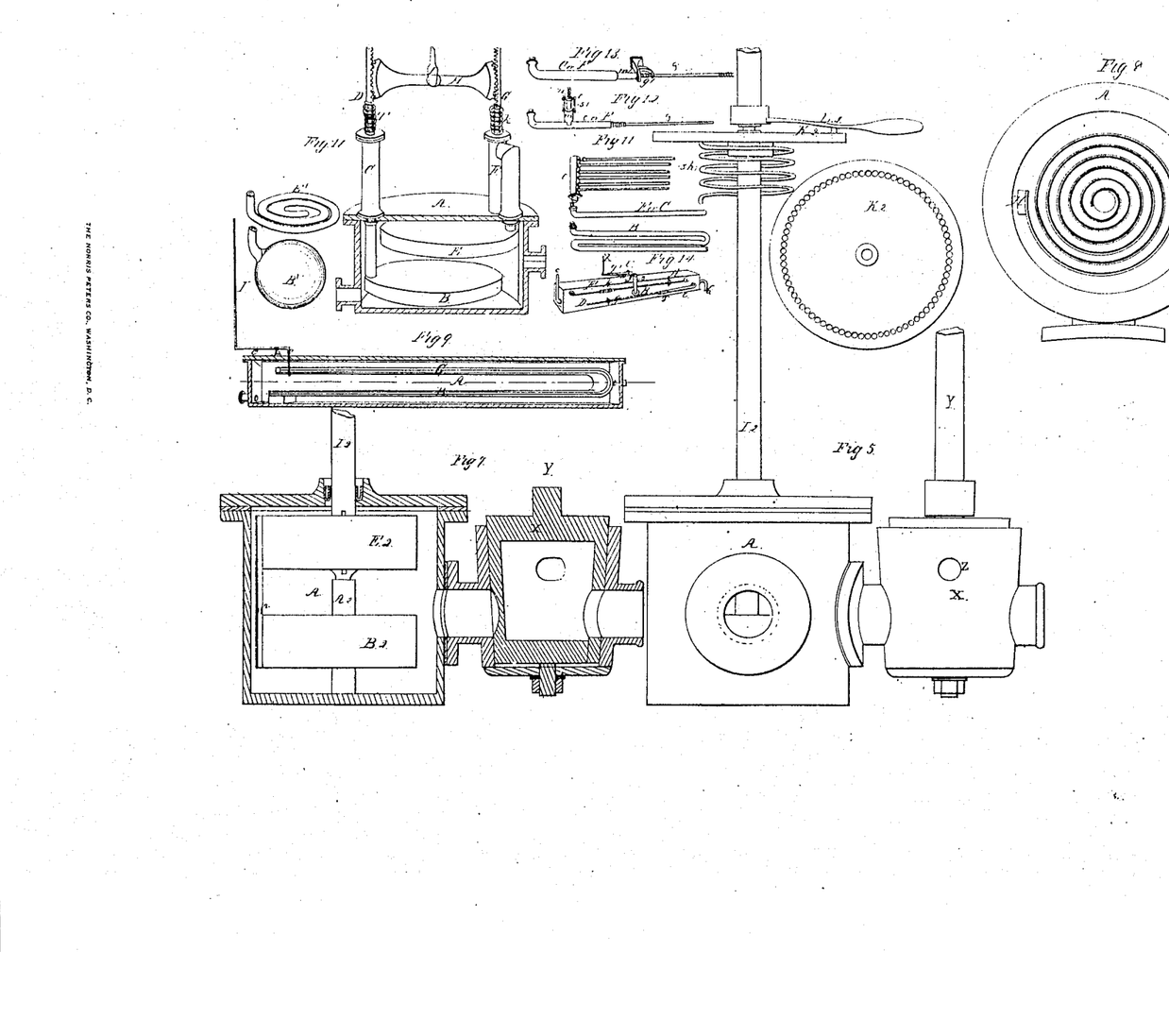
Figure 4:
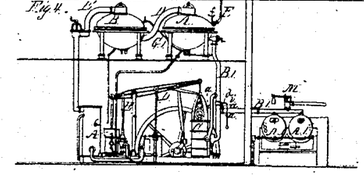
Figure 5:
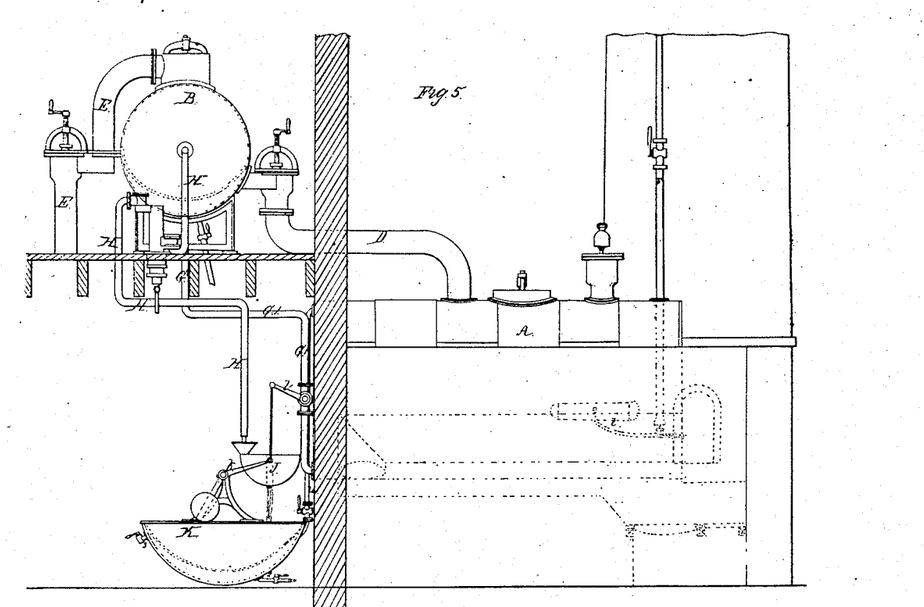
Figure 6:
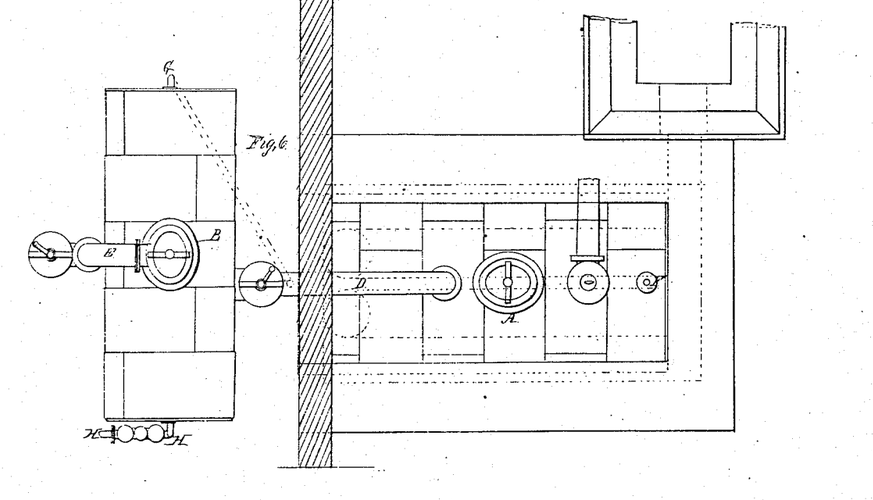

Fig. 14 represents the manner in which the piston-rods $g$ act upon the cog-wheel $r$, attached to the differential lever $s$ on the spindle $u$ of the arm I, that communicates by the rod X with the regulating-valve.

It is to be remarked that the rods $g$ $g$ are to be provided with springs to force back the pistons when the fluid or semi-fluid contracts, and that these springs are to be of such force as not to be acted upon until after the small springs $s'$ are entirely contracted.

Having fully described the principle or character of my improvements and the manner of constructing the apparatus and of operating with the same, I shall proceed to point out what I claim as my invention and desire to secure by Letters Patent.

I am aware that the escape steam from a steam-engine has been variously applied to economize fuel, and therefore it is to be understood that I do not claim this as of my invention under the head of my first improvement.

I am also aware that the vapor arising from a fluid submitted to the action of heat for evaporation or concentration has been conducted to other vessels to assist in heating them, and therefore it is to be understood that I do not, under the head of my second improvement, claim this as of my invention; and I am also aware that a single thermometer has been applied to regulate the supply of water to saline baths whenever, by concentration, it exceeds in its boiling temperature the desired degree of temperature, as this has been long since proposed by Dr. Ure; and I do not, therefore, under the head of my fourth improvement, claim as my invention the application of a thermometer to regulate the supply of liquids to evaporating-vessels; but What I do claim as my invention, and desire to secure by Letters Patent, is as follows, viz:

1. Under the head of my first improvement, I claim the employment of a weighted throttle or other regulating valve in the main steam-pipe leading from the boiler to the evaporating pan or pans and the steam-engine, which valve shall be situated between the induction-valve of the engine and the evaporating pan or pans, for the purpose and in the manner described.

2. Under the head of my second improvement, I claim a vacuum pan or pans—that is to say, an evaporating pan or pans connected with a condenser—in combination with an evaporating pan or pans, or boiler, in which the saccharine juice or other fluid is evaporated under a pressure lower, equal to, or greater than the atmosphere, which last-mentioned pan or pans, or boiler, prepares the saccharine juice, &c., from the vacuum pan or pans, and at the same time supplies the necessary vapor from the saccharine juice, &c., to complete the evaporation or concentration of the sirup, &c., in the vacuum pan or pans, as fully described above.

3. Under the head of my third improvement, I claim surrounding the evaporating-column, known as the "Champenoise" column, with an outer column or jacket, by which I am enabled to adapt it to the condition of my second-recited improvement, as described.

4. Under the head of my fourth improvement, I claim the employment of a differential thermometer to regulate the concentration of the sirup, in the manner substantially as herein described.

5. The so constructing the differential thermometer that all the range of its action up to the point desired shall not act on the regulating-valve, as described.

N. RILLIEUX. [L. S.]

Witnesses:
GEO. GRISCOM,
JOSEPH GREER.